United States Patent
Yadav et al.

(10) Patent No.: US 12,032,457 B2
(45) Date of Patent: Jul. 9, 2024

(54) INTELLIGENT DISCOVERY OF CLUSTERED ASSETS

(71) Applicant: Dell Products L.P., Round Rock, TX (US)

(72) Inventors: Sunil Yadav, Bangalore (IN); Shelesh Chopra, Bangalore (IN); Preeti Varma, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 116 days.

(21) Appl. No.: 17/872,670

(22) Filed: Jul. 25, 2022

(65) Prior Publication Data

US 2024/0028487 A1    Jan. 25, 2024

(51) Int. Cl.
| | |
|---|---|
| *G06F 11/00* | (2006.01) |
| *G06F 11/14* | (2006.01) |
| *G06F 11/20* | (2006.01) |
| *G06F 16/906* | (2019.01) |

(52) U.S. Cl.
CPC ...... *G06F 11/2023* (2013.01); *G06F 11/1458* (2013.01); *G06F 11/1464* (2013.01); *G06F 16/906* (2019.01)

(58) Field of Classification Search
CPC ............ G06F 11/1458; G06F 11/1464; G06F 11/2023
See application file for complete search history.

(56) References Cited

U.S. PATENT DOCUMENTS

| | | | | |
|---|---|---|---|---|
| 7,549,037 | B1* | 6/2009 | Kale | G06F 11/1466 711/219 |
| 8,069,366 | B1* | 11/2011 | Wenzel | G06F 11/2028 714/4.11 |
| 8,225,057 | B1* | 7/2012 | Zheng | G06F 11/1458 711/E12.001 |
| 8,473,463 | B1 | 6/2013 | Wilk | |
| 8,595,454 | B1* | 11/2013 | Nagarkar | G06F 11/1458 711/162 |
| 8,990,162 | B1 | 3/2015 | Kushwah | |
| 9,021,296 | B1* | 4/2015 | Kiselev | G06F 3/0647 714/6.23 |
| 9,077,580 | B1 | 7/2015 | Randhawa et al. | |

(Continued)

OTHER PUBLICATIONS

PowerProtect Data Manager 19.9, Administration and User Guide, Dell EMC, Jan. 2022 rev. 02, (272 pages).

(Continued)

*Primary Examiner* — Joshua P Lottich
(74) *Attorney, Agent, or Firm* — Chamberlain, Hrdlicka, White, Williams & Aughtry; Aly Z. Dossa

(57) ABSTRACT

Techniques described herein relate to a method for improving the performance of discovery in a failover cluster or similar cluster-based system. More specifically, by mapping shared volumes to a cluster client instead of individual data nodes, one or more embodiments of the invention avoid duplicative backups and/or restorations of the same shared assets by the each of the data nodes. To map the one or more shared volumes to a cluster client, the cluster manager and/or data protection manger must determine which of the volumes in the cluster are associated with either an active/passive shared volume or a cluster shared volume (CSV). Therefore, the cluster environments assets may be efficiently mapped and accessed.

20 Claims, 5 Drawing Sheets

(56) References Cited

U.S. PATENT DOCUMENTS

| | | | |
|---|---|---|---|
| 9,268,784 | B1 | 2/2016 | Guo et al. |
| 9,398,092 | B1 | 7/2016 | Singhal et al. |
| 9,501,544 | B1 | 11/2016 | Singhal et al. |
| 9,535,907 | B1* | 1/2017 | Stringham ............ G06F 11/1435 |
| 9,934,107 | B1 | 4/2018 | Chikkanayakanahally et al. |
| 10,108,502 | B1* | 10/2018 | Gopinath ............. G06F 11/1451 |
| 10,191,815 | B2 | 1/2019 | Viswanathan |
| 10,289,441 | B1 | 5/2019 | Chopra et al. |
| 10,740,005 | B1 | 8/2020 | Ives et al. |
| 10,853,189 | B2 | 12/2020 | Bishop |
| 10,860,427 | B1* | 12/2020 | Chakraborty ........ G06F 11/1464 |
| 10,936,545 | B1 | 3/2021 | Chockalingam et al. |
| 11,048,591 | B1* | 6/2021 | Mamidi ............... G06F 16/2246 |
| 2003/0163495 | A1* | 8/2003 | Lanzatella ........... G06F 11/1451 |
| 2003/0221074 | A1* | 11/2003 | Satoyama ............. G06F 3/0605 |
| | | | 714/E11.101 |
| 2008/0059721 | A1 | 3/2008 | Turner et al. |
| 2009/0177856 | A1 | 7/2009 | Herne |
| 2012/0117028 | A1 | 5/2012 | Gold et al. |
| 2014/0229695 | A1 | 8/2014 | Dinkar |
| 2014/0330785 | A1 | 11/2014 | Isherwood |
| 2016/0034366 | A1 | 2/2016 | Anglin |
| 2016/0048430 | A1 | 2/2016 | Bolik |
| 2016/0203054 | A1* | 7/2016 | Zhang ................. G06F 11/1469 |
| | | | 707/645 |
| 2018/0300206 | A1 | 10/2018 | Dai et al. |
| 2019/0377643 | A1* | 12/2019 | Zhang ................. G06F 11/1469 |
| 2021/0034709 | A1 | 2/2021 | Patwardhan |
| 2021/0055996 | A1 | 2/2021 | Owens et al. |
| 2021/0081287 | A1 | 3/2021 | Koning et al. |
| 2021/0182156 | A1 | 6/2021 | Sharma |
| 2021/0216412 | A1 | 7/2021 | Navon |

OTHER PUBLICATIONS

Dell PowerStore: Clustering and High Availability, White Paper, Dell Technologies, Jul. 2022 (45 pages).

* cited by examiner

INTELLIGENT DISCOVERY OF CLUSTERED ASSETS

BACKGROUND

In an enterprise environment, clustering is frequently used. One version of clustering, failover clustering, allows for a plurality of nodes to work together to increase the availability and scalability of the nodes. If a failure occurs in one or more of the nodes, other nodes are able to provide the services of the failed nodes with minimum disruptions to the end users of the node(s). To prevent loss of important data, performing backups and restorations of the assets located on the plurality of nodes or other related computing devices is necessary. However, in a clustering system that includes shared storage, performing a backup and/or restoration becomes increasingly difficult.

SUMMARY

In general, in one aspect, the invention relates to a method for performing discovery in a cluster environment comprising of a plurality of data nodes and a plurality of volumes. The method comprises: determining if each volume of the plurality of volumes is a shared volume. If the volume is determined to be a shared volume, the shared volume is mapped to a cluster client. If the volume is determined not to be a shared volume, the volume is mapped to its current data node. The method further comprises of storing a copy of the mappings of each volume of the plurality of volumes to each of the plurality of data nodes, wherein the copy of the mappings is used to determine which of the plurality of data nodes performs at least one of a backup or a restoration of data located on at least one volume of the plurality of volumes.

In general, in one aspect, the invention relates to a system comprising: a plurality of data nodes; a plurality of volumes; and a cluster manager. The cluster manager comprises of at least one processor, at least one storage device, and at least one memory that includes instructions. The instructions when executed by the processor, perform a method for performing discovery in a cluster environment comprising of the plurality of data nodes and the plurality of volumes. The method comprises: determining if each volume of the plurality of volumes is a shared volume. If the volume is determined to be a shared volume, the shared volume is mapped to a cluster client. If the volume is determined not to be a shared volume, the volume is mapped to its current data node. The method further comprises of storing a copy of the mappings of each volume of the plurality of volumes to each of the plurality of data nodes, wherein the copy of the mappings is used to determine which of the plurality of data nodes performs at least one of a backup or a restoration of data located on at least one volume of the plurality of volumes.

In general, in one aspect, the invention relates to a non-transitory computer readable medium which includes a computer readable program code, which when executed by a computer processor enables the computer processor to perform a method for performing discovery in a cluster environment comprising of a plurality of data nodes and a plurality of volumes. The method includes determining if each volume of the plurality of volumes is a shared volume. If the volume is determined to be a shared volume, the shared volume is mapped to a cluster client. If the volume is determined not to be a shared volume, the volume is mapped to its current data node. The method further comprises of storing a copy of the mappings of each volume of the plurality of volumes to each of the plurality of data nodes, wherein the copy of the mappings is used to determine which of the plurality of data nodes performs at least one of a backup or a restoration of data located on at least one volume of the plurality of volumes.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
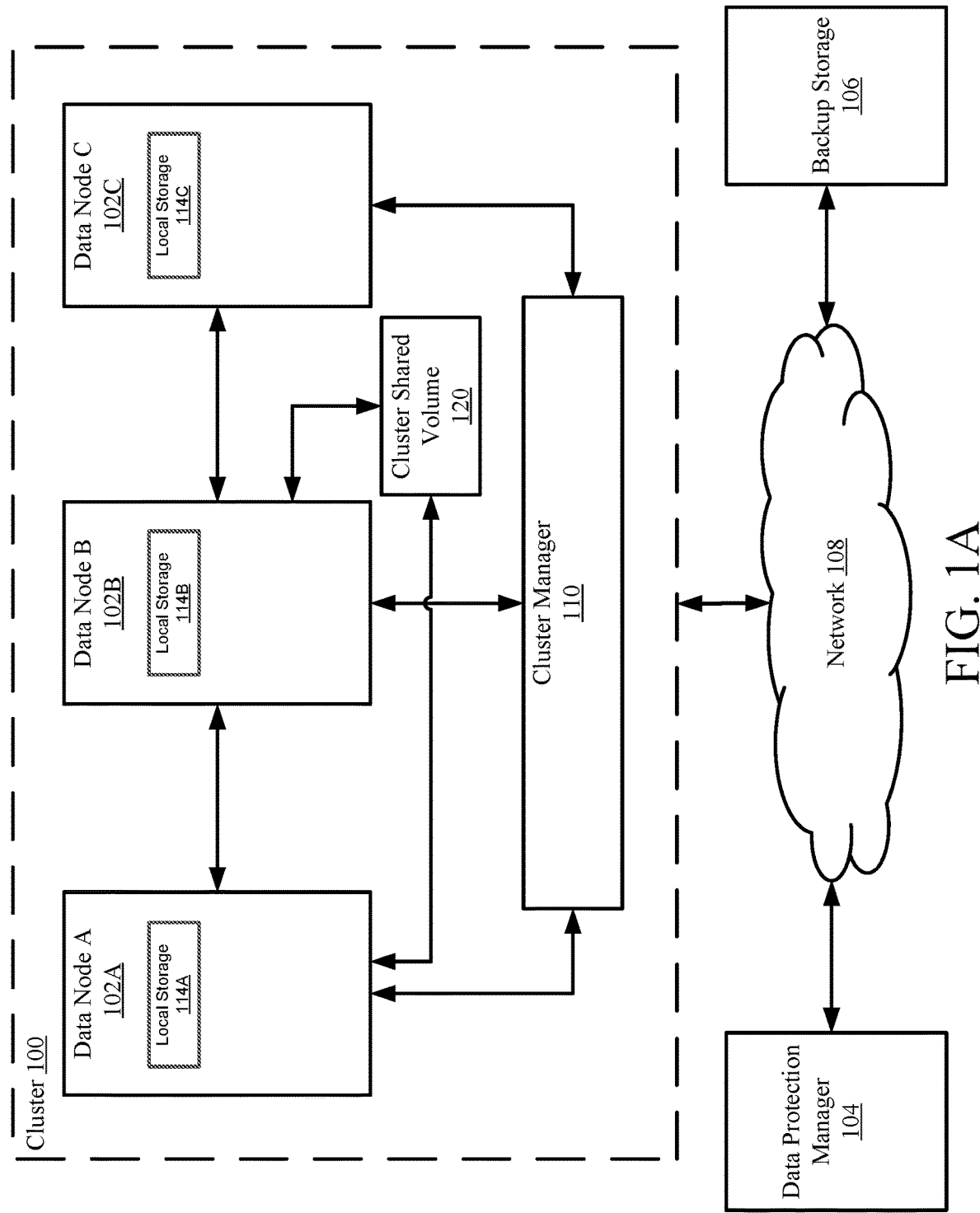
FIG. 1A shows a diagram of a cluster environment in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to C. As used herein, the aforementioned labeling means that the element may include any number of items and does not require that the element include the same number of elements as any other item labeled as A to C. For example, a data structure may include a first element labeled as A and a second element labeled as C. This labeling convention means that the data structure may include any number of the elements. A second data structure, also labeled as A to C, may also include any number of elements.

The number of elements of the first data structure and the number of elements of the second data structure may be the same or different.

In general, embodiments of the invention relate to systems and methods for managing data clusters. More specifically, embodiments of the invention relate to a method of performing discovery in each of the data nodes and various associated storage volumes that make up the data clusters. Discovery occurs periodically to maintain a proper mapping of the various volumes and their assets, and discovery occurs prior to performing a backup and/or restoration as well as other data protection events.

In an enterprise environment using clustering, the environment includes one or more clusters which each include a plurality of data nodes (also referred to as nodes). The data nodes each comprise of one or more computing devices. The data nodes are each associated with local storage devices, as well as shared storage devices including active-passive shared storage devices (where only one or a few if the active nodes have active access to the shared storage device) and active-active shared storage devices (where all the nodes have active access to the shared storage device) including cluster shared volumes (CSV). A CSV is a shared disk that is made accessible for reading and writing operations by all the nodes within the failover cluster. The CSV can include multiple (virtual) discs. It provides a consistent, distributed, namespace, that clustered roles can use to access shared storage from all nodes.

In traditional clustering systems, there is no efficient intelligence that can protect a clustering system that includes at least one CSV seamlessly. Such protection includes performing a backup and related restoration of the backup when a failure occurs. In traditional clustering system, from each data node's perspective, a CSV is owned by the data node, and the CSV is treated like any of the other local volumes on the data node. However, this treatment can result in multiple data nodes performing, what is essentially the same backup on the CSV repeatedly, needlessly using up system resources. Further during a restoration, there is no clear intelligence for determining which data node should perform the restoration on the data and applications associated with the CSV. Both scenarios can result in discontinuous and/or fragmented backups and/or restorations. A user or administrator may be required to perform manual interventions and/or establish dynamic rules to continue providing the data protection and/or perform a restoration if the node the CSV is owned by or administrated by fails.

In order to address these and other issues associated with using a CSV with failover clustering, one or more embodiments of the invention include methods of discovering the CSVs associated with a system. By performing the methods of the one or more embodiments of the invention, the system will experience better performance with the CSV. The method of one or more embodiments of the invention will result in an improved performance of the backups, restorations, and other activities that utilize the CSV and the applications and data that are stored on it. This will provide better protection for the CSV and the clustered nodes, while requiring minimal user/administrator input.

FIG. 1A shows a diagram of a system in accordance with one or more embodiments of the invention. The system may include a data protection manager (104), backup storage (106), and at least one data cluster (100). The system may include any number of data clusters (100) without departing from the invention. For example, the system may include two data clusters (not shown) that communicate through a network (108). The system may include additional, fewer, and/or other components without departing from the invention. Each of the components in the system may be operatively connected via any combination of wireless and/or wired networks (108).

In one or more embodiments of the invention, the data cluster (100) may include a plurality of nodes (102), a cluster manager (110), and at least one cluster shared volume(s) (120). The system may include any number of data nodes (102) without departing from the invention. For example, the system may include two data nodes (102A) and (102B) that communicate through an internal network or by other communication mechanisms. The system may include additional, fewer, and/or other components without departing from the invention. Each of the components of the data cluster may be operatively connected via any combination of wireless and/or wired networks (108).

In one or more embodiments of the invention, the data protection manager (104) includes the functionality to provide data protection services to the data cluster (100). The data protection manager (104) may include the functionality to provide and/or obtain other and/or additional services without departing from the invention. While FIG. 1A shows the data protection manager (104) as a separate component, it can be a part of the cluster manager (110) or located in one or more of the data nodes (e.g., 102A-102C).

To perform the aforementioned data protection services, the data protection manager (104) may include various modules such as a mapping module (not shown). The data protection manager (104) may also include persistent storage (not shown) or may store data on one or more of the local storage devices (114A-114C) that are associated with the data nodes (e.g., 102A-102C). Alternatively, the data protection manager (104) can store data on the cluster shared volumes (e.g., 120). The data protection manager (104) may include other and/or additional components without departing from the invention. Each of the aforementioned components of the data protection manager is discussed below.

In one or more embodiments of the invention, the data protection manager (104) initiates data protection events such as discovery, backup, and restoration. The data protection manger (104) communicates with the cluster (100) so that the cluster manager (110) or appropriate node (e.g., 102A-102C) can carry out the data protection event.

In one or more embodiments of the invention, the data protection manager (104) may include a user interface that allows a user or administrator to configure or change a data protection event. This may include having a display which can display a graphical user interface (GUI) that presents options to a user or administrator so that they may select from, a preferred node to perform the data protection event, and/or a user or administrator may select which assets/applications a user or administrator wants to have protected.

Figure 3:
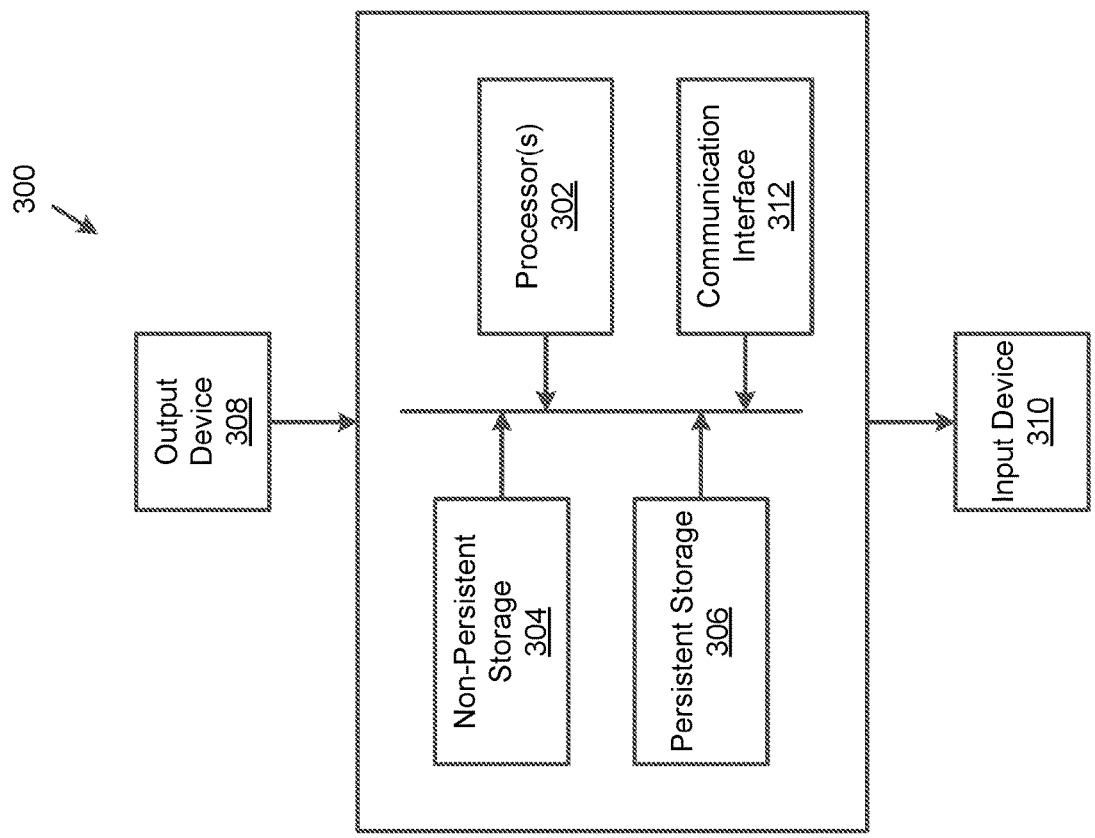
FIG. 3 shows a diagram of a computing device in accordance with one or more embodiments of the invention.

In one or more embodiments of the invention, the data protection manager (104) is implemented as a computing device (see e.g., FIG. 3). The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device will cause the computing device to perform the functionality of the data protection manager (104), as described throughout this application.

In one or more embodiments of the invention, the data protection manager (104) is implemented as a logical device. The logical device may utilize the computing resources of any number of computing devices and thereby provide the functionality of the data protection manager (104) as described throughout this application.

In one or more embodiments of the invention, the data protection manager (104) works with the backup storage (106) to store backups and mapping information. Backup storage (106) can comprise of local storage/volumes that are stored in any of the local storage devices (e.g., 114A-114C) or the cluster shared volumes (120). In one or more embodiments of the invention, the backup storage (106) can comprise of storage that is not part of the cluster (100). Backup storage (106) can also comprise of off-site storage including but not limited to, cloud base storage, and long-term storage such as tape drives, depending on the particular needs of the user and/or the system. The backup storage (106) may include one or more processors, memory (e.g., random access memory), and persistent storage (e.g., disk drives, solid state drives, etc.).

In one or more embodiments of the invention, the backup storage (106) includes the functionality to provide backup storage services to the data nodes (e.g., 102A-102C)) as discussed above. The backup storage services may include (i) obtaining backups of data generated through the performance of computer implemented services from the data nodes (100), (ii) storing data and metadata associated with the backups in persistent storage of the backup storage (106), and (iii) providing backups to the data nodes (e.g., 102A-102C) for restoration purposes and/or other and/or additional purposes without departing from the invention. The backup storage services may include the functionality to provide and/or obtain other additional services without departing from the invention. The backup storage (106) may include any number of backup storages without departing from the invention.

In one or more embodiments of the invention, the backup storage (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device that causes the computing device to perform the functionality of a backup storage (106), as described throughout this application.

In one or more embodiments of the invention, the backup storage (120) is implemented as a logical device. The logical device may utilize the computing resources of any number of computing devices and thereby provide the functionality of the backup storage (120) as described throughout this application.

In one or more embodiments of the invention the data protection manager (104) and backup storage (106), communicate with the cluster (100) through a network (108). The network (108) can take any form of network including any combination of wireless and/or wired networks. The network (108) can be a local network (LAN) or a wide area network (WLAN) including the Internet or a private enterprise network that connects more than one location. The network (108) can be any combination of the above networks, other known network, or any combination of network types.

In one or more embodiments of the invention, the network (108) allows the cluster (100) to communicate with other clusters (not shown) and external computing devices such as (but not limited to) a data protection manager (104) and backup storage (106). The various components of the cluster (100) may also communicate with each other through a network. The network may be a high-speed internal network and/or include part of an external network (108). The data nodes (120A-120C), cluster share volumes (120), and cluster manager communicate with each other over the internal network and in one or more embodiments of the invention provide fallback functionality.

A network (e.g., network (108)) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1, the network (108) may include any number of devices within any components (e.g., 100, 104, and 106) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, router, multilayer switch, fibre channel device, InfiniBand® device, etc. A network device is not limited to the aforementioned specific examples.

Figure 2A:
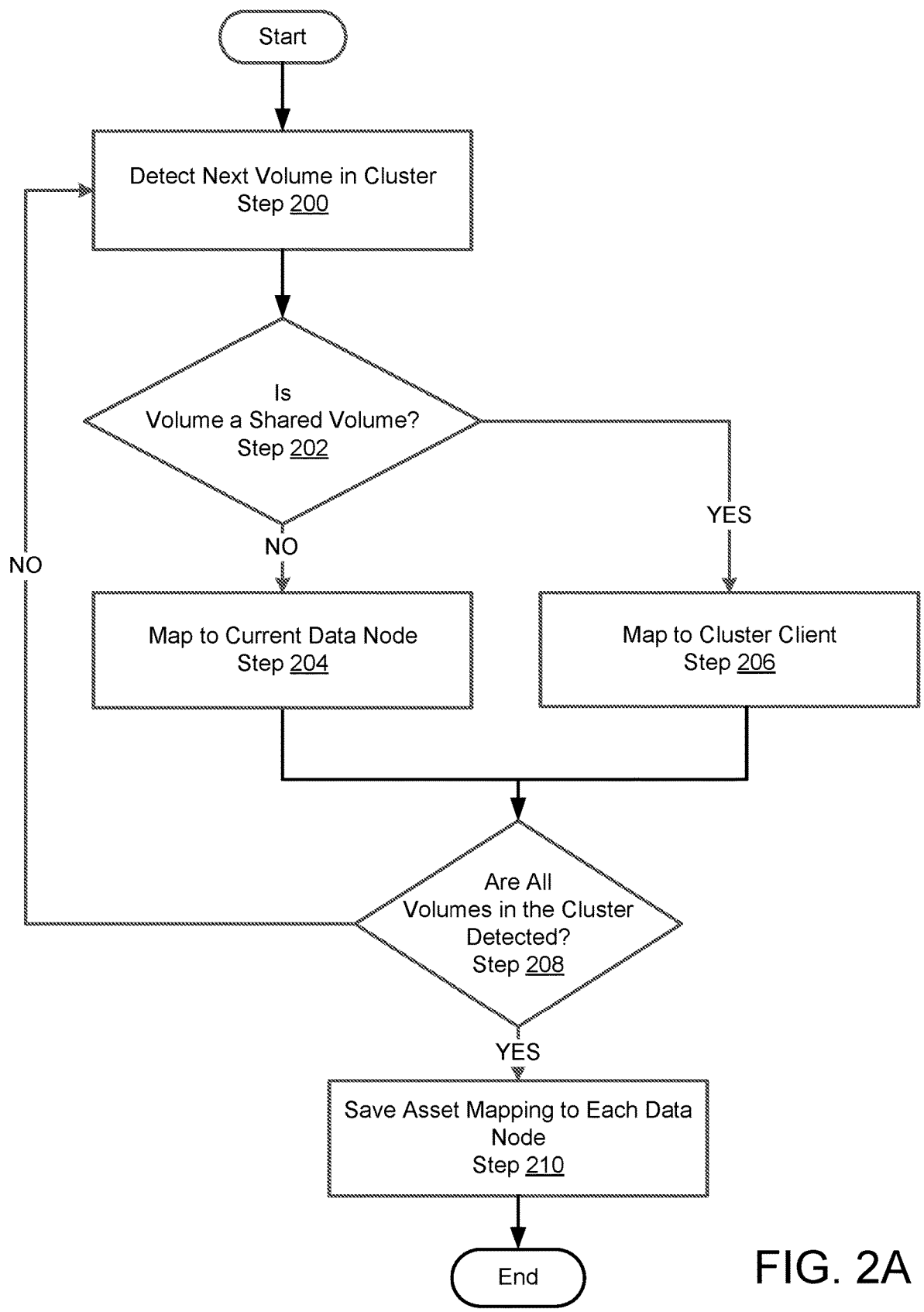
FIG. 2A shows a flowchart of a method for performing discovery and mapping of the volumes in a cluster environment in accordance with one or more embodiments of the invention.

In one or more embodiments, network devices are configured to participate in one or more network protocols, which may include discovery schemes, such as the method described in FIG. 2A, by which a given network device may obtain information about all or any of the network topology in which the network device exists. Such discovery schemes may include sharing of information between network devices and may also include providing information to other devices within the system, such as, for example, data nodes (e.g., 102A-102C), backup storage (120) and/or shared storages (110).

In one or more embodiments of the invention, a data cluster (e.g., 100) may be implemented as one or more computing devices. A data cluster (e.g., (100)) may include any number of computing devices without departing from the invention. The data cluster may include different numbers of computing devices, different quantity, and types of computer resources, and may perform different computer implemented services without departing from the invention.

In one or more embodiments of the invention, the data cluster (100) includes a plurality of data nodes (e.g., 120A-120C) which include the functionality to obtain data protection services from the data protection manager (e.g., 104) and/or the cluster manager (e.g., 110). While shown as containing only three data nodes (e.g., 102A-102C), the data cluster (100) can include more or less data nodes without departing from the invention, for example a cluster (100) could comprise of at least sixteen data nodes, at least fifty data nodes, or at least a hundred data nodes without departing from the invention. The cluster can also includes shared storage including at least one CSV (e.g., 120) which is active with each of the data nodes (e.g., 102A-102C) of the data cluster (100). Other types of shared storage can also or alternatively be included such as active-passive storage and local storage (e.g., 114A-114C).

In one or more embodiments of the invention, the data nodes (e.g., 102A-102B) perform workloads and provide services to clients and/or other entities not shown in the system illustrated in FIG. 1A. The data nodes (e.g., 102A-102C)) may further include the functionality to perform computer implemented services for users (e.g., clients, not shown) of the data cluster (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The data nodes (e.g., 102A-102C) include local storage (e.g., 114A-114C) which may include multiple volumes, as well as are able to access shared storage which may include cluster shared volumes (CSVs e.g., 120). The various data storage volumes (e.g., 114A-114C as well as CSV 120) perform data storage services which may include storing, modifying, obtaining, and/or deleting data stored on the shared storages (e.g., 120). The data storage services may include other and/or additional services without departing from the invention. The data generated and stored on the shared storages (e.g., 114A-114C as well as CSV 120) by the data nodes (e.g., 102A-102C) may be valuable to users of the system, and therefore may be protected. The data nodes (e.g., 102A-102C) may obtain backup storage services from the backup storage (106). Alternatively, the data nodes (e.g., 102A-102C) may provide backup storage services themselves and include backup storage on the local storage (e.g., 114A-114C) or the cluster shared volumes (e.g., 120). The backup storage services may include storing backups of data stored on the shared storages for restoration purposes. The backup storage services may include other and/or additional services without departing from the invention.

The data nodes (e.g., 102A-102C) may include the functionality to perform data protection services for data stored in the various data storage volumes (e.g., 114A-114C as well as CSV 120). The data protection services may include generating backups of data stored in the shared storages (110) and storing the backups in the backup storage (110). The data nodes (100) may include the functionality to perform other and/or additional services without departing from the invention.

The data nodes (e.g., 102A-102C), may be operably connected to one or more cluster shared storages (e.g., 120) and may obtain data storage services from the one or more cluster shared storages (e.g., 120). The data nodes (e.g., 102A-102C) may be operably connected to each other, and each data node (e.g., 102A) may include the ability to use all or part of the volumes including shared active-passive drives that form the local storage (e.g., 114A-114C) of the other data nodes (e.g., 102B and 102C).

In one or more embodiments of the invention, the data nodes (e.g., 102A-102C) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions which are stored on the persistent storage, that when executed by the processor(s) of the computing device it causes the computing device to perform the functionality of the data nodes (e.g., 102A-102C) as described throughout this application.

In one or more embodiments of the invention, the data nodes (e.g., 102A-102C) are implemented as a logical device. The logical device may utilize the computing resources of any number of computing devices and thereby provide the functionality of the data nodes (e.g., 102A-102C) as described throughout this application.

In one or more embodiments of the invention, the data nodes (e.g., 102A-102C) include storage that includes local storage (e.g., 114A-114C) that is associated with only their assigned data node. The storage also includes shared storage such as a cluster shared volume CSV (e.g., 120). The storage can also include other types of shared volumes including active-passive shared volumes which only provide data storage services to the data nodes they are active on.

The data nodes (e.g., 102A-102C) as well as other components of the cluster and connected devices, may perform data storage services. The data storage services may include storing, modifying, obtaining, and/or deleting data stored on the local and/or shared storages (e.g., 114A-114C and 120) based on instructions and/or data obtained from the data nodes (e.g., 102A-102C) or other components of the cluster (e.g., 100). The data storage services may include other and/or additional services without departing from the invention. The local and shared storages (e.g., 114A-114C and 120) may include any number of storage volumes without departing from the invention.

The local and shared storages (e.g., 114A-114C and 120) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 114A-114C and 120) may utilize portions of any combination of hard disk drives, solid state disk drives, tape drives, and/or any other physical storage medium for any number of computing devices.

In one or more embodiments of the invention, the local and shared storages (e.g., 114A-114C and 120) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, which are stored on the persistent storage, so that when executed by the processor(s) of the computing device they cause the computing device to perform the functionality of the local and shared storages (e.g., 114A-114C and 120) as described throughout this application.

In one or more embodiments of the invention, the data nodes (e.g., 102A-102C) as well as associated local and shared storages (e.g., 114A-114C and 120) are managed by a cluster manager (e.g., 110). The cluster manager (110) performs a plurality of functions including but not limited to managing and configuring the services provided by the data nodes (e.g., 102A-102C), managing the mapping and movement of data on at least the shared volumes including any cluster shared volumes (e.g., 120). The cluster manager (110) can perform other functions attributed to other components of the system or function not described herein without departing from the invention.

In one or more embodiments of the invention the cluster manager (110) includes the functionality to perform a portion of the data protection services of the data protection manager (104). This may include performing discovery of the volumes and assets associated with the data nodes (e.g., 102A-102C) including those stored on the local storage (e.g., 114A-114C) and the CSV (e.g., 120). The method of performing the discovery is discussed in more detail below with regards to the method shown in FIG. 2A. The cluster manager (110) may also perform, or initiate backups and restorations as discussed in more detail below with regards to the method shown in FIG. 2B. The cluster manager (110) may include the functionality to perform and or obtain other and/or additional services without departing from the invention.

In one or more embodiments of the invention, the cluster manager (110) may perform discovery on the volumes and assets of the volumes and assets associated with the data nodes (e.g., 102A-102C) including those stored on the local storage (e.g., 114A-114C) and the CSV (e.g., 120) as discussed in more detail below with regards to FIG. 2A. The cluster manager queries each data node (e.g., 102A-102C) and their associated local and shared storage (e.g., 114A-114C and 120). Using the results of the query and method of FIG. 2A, the cluster manager (110) produces an asset mapping, a non-limiting example is shown in FIG. 1B, of the asset mapping (e.g., 128).

Figure 1B:
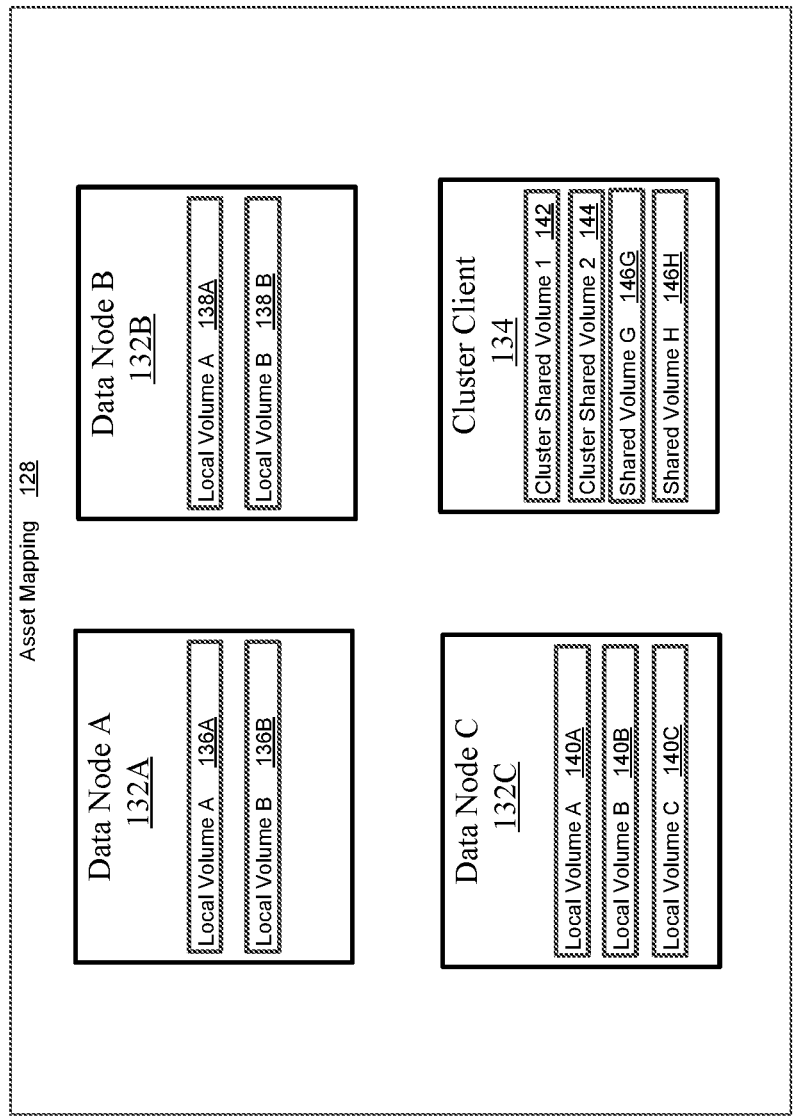
FIG. 1B shows a diagram of an exemplary asset mapping in accordance with one or more embodiments of the invention.

FIG. 1B shows an exemplary asset mapping (e.g., 128) for a three data node system such as that shown in FIG. 1A. The asset mapping (128) includes three data node mappings (e.g., 132A-132C) that may correspond to the data nodes of FIG. 1A (e.g., 102A-102C of FIG. 1A). The data node mappings (e.g., 132A-132C) include mappings of each volume and its associated assets that are located only on the local storage (e.g., 114A-114C of FIG. 1A). Each data node mapping can include multiple volumes which can correspond to physical drives or virtual drives.

For example, the mapping of data node A (132A) may include two local volumes A and B (e.g., 136A and 136B), and the mapping of data node B (132B) may also include two local volumes A and B (e.g., 138A and 138B). While both data node A (132A) and data node B (132B) both have local volumes A and B, these are separate volumes and only accessible by the appropriate data node, i.e., local volumes 136A and 136B, are only accessible by data node A (132A which can correspond to 102A of FIG. 1A) while local volumes 138A and 138B, are only accessible by data node B (132B which can correspond to 102B of FIG. 1A). As shown in the example of FIG. 1B, the mapping of data node C (132C which can correspond to 102C of FIG. 1A) may include three local volumes A-C (140A-140C). Each mapping of the data nodes (e.g., 132A-132C) may include more or a smaller number of volumes as determined by the cluster manager (e.g., 110, FIG. 1A) during discovery.

The exemplary asset mapping (e.g., 128) also includes a cluster client mapping (134) for volumes that are shared by more than one data node (e.g., 102A-102C, FIG. 1A). Instead of mapping them to the individual nodes (132A-132C) that they are mounted on, one or more embodiments of the invention map them to a separate cluster client (e.g., 134) which notifies any component of the cluster (e.g., 100 FIG. 1A) or the system in general that these assets can be accessed/managed by more than one data node (e.g., 102A-102, FIG. 1A). In the example of FIG. 1B, two active-passive volumes (146G and 146H) are mapped to the cluster client, along with two cluster shared volumes (142 and 144). More or less, shared volumes can be mapped, and the invention is not limited to the exemplary mappings of FIG. 1B.

The asset mapping (e.g., 128) may include additional information from that shown in FIG. 1B and described herein. The asset mapping (e.g., 128) may also include information about the location of specific applications and their data on the mapped volumes. The asset mapping (e.g., 128) may also include such information as dependency information, data types (e.g., image data, file data, database data, etc.), and data change rates (i.e., the amount of data change per unit of time). The asset mapping (e.g., 128) may include other and/or additional types of information without departing from the invention.

The asset mapping (e.g., 128), once produced by the cluster manager (e.g., 110, FIG. 1A), is stored on each of the data nodes (e.g., 102A-102C, FIG. 1A). This allows the each of the data nodes (e.g., 102A-102C, FIG. 1A) to know where a given asset is located at any given time. By updating the discovery periodically, such as, but not limited to, every fifteen seconds, the asset mapping (e.g., 128) can remain accurate and provide quicker access times with less inter-node messaging. Further if one data node fails, the location of at least the shared assets is not lost.

In one or more embodiments of the invention, the cluster manager (e.g., 110, FIG. 1A) is a physical device. The physical device may include circuitry. The physical device may be, for example, a field-programmable gate array, application specific integrated circuit, programmable processor, microcontroller, digital signal processor, or any other hardware processor. The physical device may be adapted to provide the functionality of the cluster manager (e.g., 110, FIG. 1A) described throughout this application.

In one or more embodiments of the invention, the cluster manager (e.g., 110, FIG. 1A) is implemented as computer instructions, e.g., computer code, stored on a persistent storage that when executed by a processor of the cluster (e.g., 100, FIG. 1A) including any-one-of the data nodes (e.g., 102A-102C, FIG. 1A) will provide the functionality of the cluster manager (e.g., 110, FIG. 1A) described throughout this application.

In one or more embodiments of the invention, the cluster manager (e.g., 110, FIG. 1A) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, so that when executed by the processor(s) of the computing device it may cause the computing device to perform the functionality of a cluster manager (e.g., 110, FIG. 1A) as described throughout this application.

In one or more embodiments of the invention, the cluster manager (e.g., 110, FIG. 1A) is implemented as a logical device. The logical device may utilize the computing resources of any number of computing devices and thereby provide the functionality of the backup storage (e.g., 120, FIG. 1A) as described throughout this application.

Figure 2B:
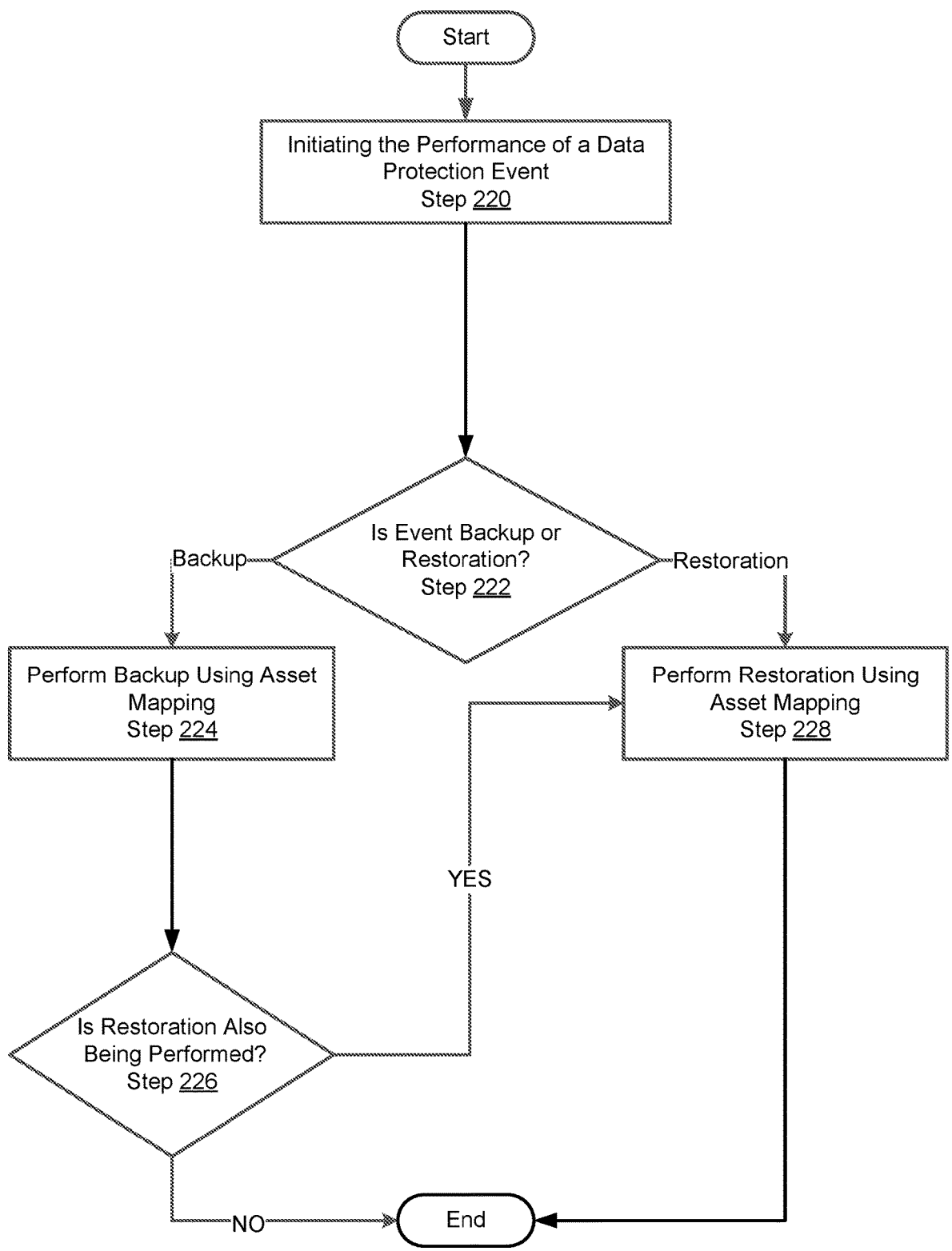
FIG. 2B shows a flowchart of a method for performing a data protection event such as a backup and/or restoration in accordance with one or more embodiments of the invention.

In one or more other embodiments of the invention, one or more of the functions of the cluster manager (e.g., 110, FIG. 1A) including the methods of both FIGS. 2A and 2B may be performed by a data protection manger (e.g., 104, FIG. 1A), a backup storage (e.g., 106, FIG. 1A), the individual data nodes (e.g., 102A-102C, FIG. 1A), or other component of the system without departing from the invention.

The method shown in FIG. 2A below may occur after the cluster manager or an agent(s) executing on the data nodes collected metadata related to the volumes and/or discs that are mounted on the data node(s). This metadata is then received by the cluster manager and/or the data protection manager (104). The data protection manager then analyzes the metadata (as discussed in FIG. 2A) in order to determine whether a given volume of disc is shared volume or disc. Once this classification is made, all identified shared volumes are associated with a cluster client. The cluster client is a logical structure that allows the data protection manager to store information (or at least the identity) of each shared volume. By associating the shared volumes with the cluster client as opposed to a specific data node, the information related to tracking the shared volumes does not need to be duplicated (example below).

FIG. 2A shows a flowchart of a method for performing discovery of the volumes in the cluster (e.g., 100, FIG. 1A) in accordance with one or more embodiments of the invention. The method may be performed by, for example, the cluster manager (e.g., 110, FIG. 1A) or a data protection manager (e.g., 104, FIG. 1A). Other components of the system illustrated in FIG. 1A may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, in accordance with one or more embodiments of the invention, the next volume in a cluster is detected. This step is performed after an initial discovery event associated with a data cluster is initiated. This discovery event may occur periodically or at least before a protection policy event is initiated such as backup or restoration (see FIG. 2B for more details). During step 200, the next volume of each of the volumes in the cluster is detected. Once the next volume is detected, the method proceeds to step 202.

In step 202, in accordance with one or more embodiments of the invention, the method determines if the volume detected in step 200 is a shared volume such as a cluster shared volume (CSV) or an active-passive shared volume. If the volume is not a shared volume, it is mapped in step 204, to the current data node the volume is associated with. Alternatively, the volume can be mapped to any appropriate node, or container as needed.

If in step 202, it is determined that the volume is a shared volume, it is then, in accordance with one or more embodiments of the invention, mapped to a cluster client in step 206. The method is not limited to mapping the shared volumes to a cluster client and can be mapped to any client or container for storing share volumes as established either by a user or administrator at the time when the cluster (e.g., 100 of FIG. 1) is configured and/or initialized. Alternatively, the client or container for sharing shared volumes can be determined at the time discovery is initialized or as an aspect of any protection policy event that is to be performed after completion of the discovery.

After either step 204 or 206 is performed, the method in accordance with one or more embodiments of the invention proceeds to step 208. In step 208, it is determined if all the volumes in the cluster have been detected, if not, the method returns from step 208 to step 200 where the next volume is selected and the method of steps 202-208 repeat. If, instead, all volumes have been detected, the method proceeds from step 208 to step 210.

In one or more additional embodiments of the invention, steps 200 and 208 are only performed for a set number of volumes. Such an instance can occur when there is only one pertinent data node, but the data node uses shared storage. The method in accordance with other embodiments can include detecting the volumes in more than one cluster or any number of volumes in a cluster or other computing environment.

In one or more embodiments of the invention, once all the volumes in the cluster are detected, the method proceeds from step 208 to step 210. The asset mapping made in steps 204 and 206 are then saved to each data node of the cluster. An exemplary mapping is shown in FIG. 1B. Other forms of the mapping can be used, and the invention is not limited to that shown in FIG. 1B.

In accordance with other one or more embodiments of the invention, the asset mapping can alternatively be stored on storage of one of: the cluster manager (e.g., 110, FIG. 1A), the data protection manager (e.g., 104, FIG. 1A), and/or the Backup Storage (e.g., 106, FIG. 1A). Other locations can be used to store the asset mapping without departing from the invention.

In one or more embodiments of the invention, the method ends following step 210.

FIG. 2B shows a flowchart of a method for performing a protection event. The method may be performed by, for example, data protection manager (e.g., 104, FIG. 1A) the cluster manager (e.g., 110, FIG. 1A), and/or a data node (e.g., 102A-102C, FIG. 1A). Other components of the system illustrated in FIG. 1A may perform all, or a portion, of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, a data protection event is initialized. In one or more embodiments of the invention this may be initialized based on an automatic policy or by a user/administrator's request. In accordance with one or more other embodiments of the invention the data protection event may be initialized automatically when one or more data nodes have a failover event. Other means for initializing a protection event discovery event associated with a data cluster can be used without departing from the invention.

Once the data protection event is initialized in step 220, in accordance with one or more embodiments of the invention, it is determined in step 222 if the event is a backup or a restoration of selected assets and/or applications. If the event includes a backup the method proceeds to step 224, alternatively if the even only includes a restoration of selected assets and/or applications, the method proceeds to step 228.

While step 222 only describes determining between backup and restoration events, other data protection events and follow similar steps to either the backup or restoration steps as appropriate without departing form the invention. Such other events can include snapshots, archiving, migrating, and other data protection events.

The assets and/or applications for backup and/or restoration, in one or more embodiments of the invention can be selected prior to initializing the data protection event. Alternatively, the specific assets and/or applications can be chosen after the event is initialized, based on selections and/or configuration by the user, administrator, and/or an automatic process which initiates the data protection event.

In step 224, in accordance with one or more embodiments of the invention a restoration is performed using the asset mapping. This may be the same asset mapping produced in the method of FIG. 2A as described in more detail above. This mapping may have been performed periodically prior to the protection policy event, or in accordance with one or more embodiments, it is performed after the protection policy event and prior to performing a backup. Alternatively, the mapping used for performing the backup in step 224 can be produced by other means.

In step 226, in accordance with one or more embodiments of the invention, it can be determined whether the protection policy event also includes performing a restoration. If a restoration is also to be performed, the method proceeds to step 228. If a restoration is not to be performed, in one or more embodiments of the invention the method ends following step 226.

If the event is determined in step 222 or 226 to also, or alternatively, include performing a restoration, the method proceeds to step 228. In step 228 a restoration is performed using the asset mapping. This may be the same asset mapping used for the backup that the restoration is performed from. Alternatively, at least one new mapping is produced prior to performing the restoration. Similarly, to the backup in step 224, the asset mapping can be produced by the discovery method described in more detail with regards to FIG. 2A above. Alternatively, the mapping can be produced by other means.

In one or more embodiments of the invention, the method ends following step 228 or as described above after step 226 if a restoration is not to be performed.

To further clarify embodiments of the invention, a non-limiting example is provided below in tables 1 and 2. Tables 1 and 2 provide a mapping of various storage volumes associated with each data node, before (e.g., Table 1) and after (e.g., Table 2) performing the method of FIG. 2A. The tables may show a system similar to that illustrated in FIG. 1A. For the sake of brevity, only a limited number of components illustrated in FIG. 1A are described in the following example.

Example

Table 1 shows an exemplary configuration of three data node cluster and the storage that each of the data nodes have access to. For the sake of brevity, only a limited number of nodes and components are described in Table 1.

TABLE 1

| List of Nodes | List of Assets Associated with Each Data Node |
| --- | --- |
| Node 1 | Local C:\ |
|  | Local E:\ |
|  | Shared drive G:\ |
|  | CSV Volume 1 |
|  | (C:\Clusterstorage\volume1) |
|  | CSV Volume 2 |
|  | (C:\Clusterstorage\volume2) |
| Node 2 | Local C:\ |
|  | Local Z:\ |
|  | Local F:\ |
|  | Shared drive G:\ |
|  | Shared drive H:\ |
|  | CSV Volume 1 |
|  | (C:\Clusterstorage\volume1) |
|  | CSV Volume 2 |
|  | (C:\Clusterstorage\volume2) |
| Node 3 | Local C:\ |
|  | Local A:\ |
|  | CSV Volume 1 |
|  | (C:\Clusterstorage\volume1) |
|  | CSV Volume 2 |
|  | (C:\Clusterstorage\volume2) |

As shown Table 1, Data node 1, has access to a local storage device that includes a C:\ and a E:\ volume. Data node 1 also has access to an active passive shared drive G:\ and two CSV volumes: volume 1 and volume 2. Data node 2 has access to a local storage device that includes a C:\, Z:\, and F:\ volume. Data node 2 also has access to two active passive shared drives G:\ and H:\ as well as the two CSV volumes: volume 1 and volume 2. Data node 3 has access to a local storage device that includes a CA and AA. Data node 3 is not connected to the active-passive shared drives but does have access to the two CSV volumes: volume 1 and volume 2.

Once discovery is performed by the cluster manager in accordance with the one or more embodiments of the invention, a new mapping is produced as shown in Table 2.

TABLE 2

| List of Nodes | Original List of Assets Associated with each of the Data Nodes. | New List of Assets after discovery is performed. |
| --- | --- | --- |
| Node 1 | Local C:\ | Local C:\ |
|  | Local E:\ | Local E:\ |
|  | Shared drive G:\ |  |
|  | CSV Volume 1 |  |
|  | (C:\Clusterstorage\volume1) |  |
|  | CSV Volume 2 |  |
|  | (C:\Clusterstorage\volume2) |  |
| Node 2 | Local C:\ | Local C:\ |
|  | Local Z:\ | Local Z:\ |
|  | Local F:\ | Local F:\ |
|  | Shared drive G:\ |  |
|  | Shared drive H:\ |  |
|  | CSV Volume 1 |  |
|  | (C:\Clusterstorage\volume1) |  |
|  | CSV Volume 2 |  |
|  | (C:\Clusterstorage\volume2) |  |
| Node 3 | Local C:\ | Local C:\ |
|  | Local A:\ | Local A:\ |
|  | CSV Volume 1 |  |
|  | (C:\Clusterstorage\volume1) |  |
|  | CSV Volume 2 |  |
|  | (C:\Clusterstorage\volume2) |  |

TABLE 2-continued

| List of Nodes | Original List of Assets Associated with each of the Data Nodes. | New List of Assets after discovery is performed. |
|---|---|---|
| Cluster Client | None | Shared drive G:\ Shared drive H:\ CSV Volume 1 (C:\Clusterstorage\volume1) CSV Volume 2 (C:\Clusterstorage\volume2) |

As shown Table 2, after discovery is performed in accordance with one or more embodiments of the invention data node 1, it is associated only with local storage volumes C:\ and a E:\. Data node 2, is associated only with local storage volumes C:\, Z:\, and F:\. Data Node 3 is associated with local storage volumes C:\ and A:\. The shared volumes (G:\, H:\ and CSV volumes 1 and 2) are now associated with a cluster client.

If a backup or other protection event is triggered, as described in more detail in method of FIG. 2B, the system knows that the volumes in the cluster client can be treated by a plurality of nodes and the system can ensure that only one node performs the protection event on those volumes.
End of Example As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices. More specifically, by mapping the shared volumes to a cluster client instead of individual data nodes, one or more embodiments of the invention avoid duplicative backups and/or restorations of the same shared assets by each of the data nodes. To map, the one or more shared volumes to a cluster client, the cluster manager and/or data protection manger must determine which of the volumes in the cluster are associated with either an active/passive shared volume or a CSV. Therefore, the cluster environments assets may be efficiently mapped and accessed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for performing discovery in a cluster environment comprising of a plurality of data nodes and a plurality of volumes, the method comprising:
   determining if each volume of the plurality of volumes is a shared volume, wherein:
      if the volume is determined to be a shared volume, mapping the volume to a cluster client,
      if the volume is determined not to be a shared volume, mapping the volume to its current data node; and
   storing a copy of mappings of each volume of the plurality of volumes to each of the plurality of data nodes,
   wherein the copy of the mappings of each volume is used to determine which of the plurality of data nodes performs at least one of a backup or a restoration of data located on at least one volume of the plurality of volumes.

2. The method of claim 1, wherein a user of the cluster environment initiates the at least one of a backup or a restoration of the data located on the at least one volume.

3. The method of claim 1, wherein the determining and storing is repeated when a predetermined amount of time since the determining and storing has elapsed.

4. The method of claim 1, wherein the determining and storing is repeated prior to performing the backup or restoration of data located on at least one volume of the plurality of volumes.

5. The method of claim 1, wherein the cluster environment is a clustered failover system, and the plurality of data nodes are failover nodes.

6. The method of claim 1, wherein, if the volume is determined to be a shared volume, then the volume is a clustered share volume.

7. The method of claim 1, wherein, if the volume is determined to be a shared volume, then the volume is a member of an active-passive pair of volumes.

8. A system comprising:
a plurality of data nodes;
a plurality of volumes; and
a data protection manager comprising of:
- at least one processor;
- at least one storage device; and
- at least one memory that includes instructions, which when executed by the processor, perform a method for performing discovery in a cluster environment comprising of the plurality of data nodes and the plurality of volumes, the method comprising:
  - determining if each volume of the plurality of volumes is a shared volume, wherein:
    - if the volume is determined to be a shared volume, mapping the volume to a cluster client,
    - if the volume is determined not to be a shared volume, mapping the volume to its current data node; and
  - storing a copy of mappings of each volume of the plurality of volumes to each of the plurality of data nodes,
    - wherein the copy of the mappings of each volume is used to determine which of the plurality of data nodes performs at least one of a backup or a restoration of data located on at least one volume of the plurality of volumes.

9. The system of claim 8, wherein the determining and storing is repeated when a predetermined amount of time since the determining and storing has elapsed.

10. The system of claim 8, wherein the determining and storing is repeated prior to performing the backup or restoration of data located on at least one volume of the plurality of volumes.

11. The system of claim 8, wherein the cluster environment is a clustered failover system, and the plurality of data nodes are failover nodes.

12. The system of claim 8, wherein, if the volume is determined to be a shared volume, then the volume is a clustered share volume.

13. The system of claim 8, wherein, if the volume is determined to be a shared volume, then the volume is a member of an active-passive pair of volumes.

14. A non-transitory computer readable medium comprising computer readable program code, which when executed by a computer processor enables the computer processor to perform a method for performing discovery in a cluster environment comprising of a plurality of data nodes and a plurality of volumes, the method comprising:
- determining if each volume of the plurality of volumes is a shared volume, wherein:
  - if the volume is determined to be a shared volume, mapping the volume to a cluster client,
  - if the volume is determined not to be a shared volume, mapping the volume to its current data node; and
- storing a copy of mappings of each volume of the plurality of volumes to each of the plurality of data nodes,
  - wherein the copy of the mappings of each volume is used to determine which of the plurality of data nodes performs at least one of a backup or a restoration of data located on at least one volume of the plurality of volumes.

15. The non-transitory computer readable medium of claim 14, wherein a user of the cluster environment initiates the at least one of a backup or a restoration of the data located on the at least one volume.

16. The non-transitory computer readable medium of claim 14, wherein the determining and storing is repeated when a predetermined amount of time since the determining and storing has elapsed.

17. The non-transitory computer readable medium of claim 14, wherein the determining and storing is repeated prior to performing the backup or restoration of data located on at least one volume of the plurality of volumes.

18. The non-transitory computer readable medium of claim 14, wherein the cluster environment is a clustered failover system, and the plurality of data nodes are failover nodes.

19. The non-transitory computer readable medium of claim 14, wherein, if the volume is determined to be a shared volume, then the volume is a clustered share volume.

20. The non-transitory computer readable medium of claim 14, wherein, if the volume is determined to be a shared volume, then the volume is a member of an active-passive pair of volumes.

* * * * *